Figure 1:
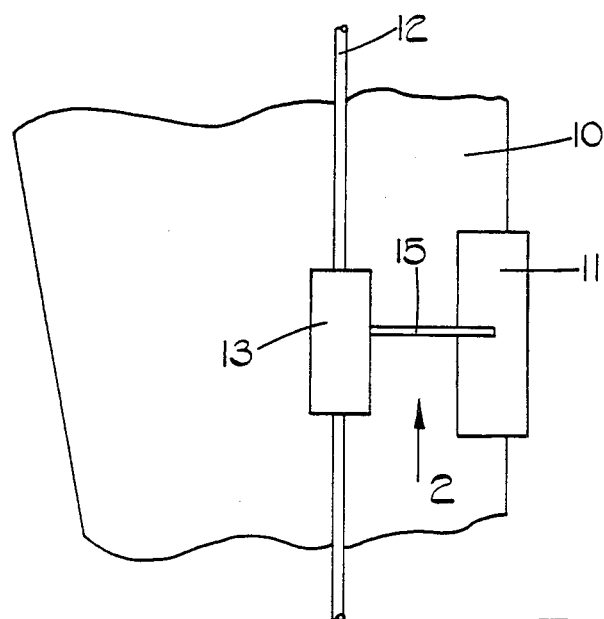

United States Patent [19]

Fairbairn et al.

[11] Patent Number: 4,613,023

[45] Date of Patent: Sep. 23, 1986

[54] DEVICE FOR LIMITING OUTPUT FORCE APPLIED BY A ROTARY TRANSMISSION

[75] Inventors: Terence W. F. Fairbairn, Welwyn Garden City; Terence J. Capewell, Stafford, both of England

[73] Assignee: Lucas Industries Public Limited Company, Birmingham, England

[21] Appl. No.: 667,428

[22] Filed: Nov. 1, 1984

[30] Foreign Application Priority Data

Nov. 5, 1983 [GB] United Kingdom ............... 8329617

[51] Int. Cl.[4] .......................... F16D 67/00; F16D 7/00
[52] U.S. Cl. .................................. 192/8 R; 192/56 R; 188/134
[58] Field of Search ............. 244/75 R, 213; 192/8 R, 192/15, 56 R, 144, 150; 188/134; 464/36

[56] References Cited

U.S. PATENT DOCUMENTS

| | | | |
|---|---|---|---|
| 2,500,691 | 3/1950 | Lear | 244/213 X |
| 2,732,746 | 1/1956 | Livermont | 192/56 R X |
| 2,771,804 | 11/1956 | Better et al. | 192/56 R X |
| 2,809,736 | 10/1957 | Hoover | 192/150 X |
| 3,030,052 | 4/1962 | Grudin | 244/75 R |
| 3,263,946 | 8/1966 | Roberts et al. | 244/75 R |
| 3,640,150 | 2/1972 | Leiner et al. | 244/75 R X |
| 3,802,281 | 4/1974 | Clarke | 192/56 R X |
| 4,180,222 | 12/1979 | Thornburg | 244/75 R |

FOREIGN PATENT DOCUMENTS

| | | | |
|---|---|---|---|
| 2712916 | 10/1977 | Fed. Rep. of Germany | 244/75 R |
| 1220200 | 1/1971 | United Kingdom | 244/213 |
| 1448101 | 9/1976 | United Kingdom . | |

*Primary Examiner*—Rodney H. Bonck
*Assistant Examiner*—Richard M. Lorence

[57] ABSTRACT

A device is provided for causing the force applied by a rotary transmission to a driven apparatus to have a substantially constant limiting value of the range of operation of the apparatus, and comprises a clutch which is responsive to the transmitted torque and to the operating position of an output member of the device, and a brake which is responsive to relative movement of the clutch parts to arrest at least the output member.

6 Claims, 4 Drawing Figures

DEVICE FOR LIMITING OUTPUT FORCE APPLIED BY A ROTARY TRANSMISSION

This invention relates to a device by means of which a substantially constant upper limit may be set on the force applied by an output member of a rotary transmission, for all angular positions of that output member.

It is known to provide torque limiting devices in rotary transmissions so that jamming of a driven device does not result in damage either to that device or to a structure on which the device is mounted. It is particularly important to provide torque limiting devices in the rotary transmissions to air flow control surfaces, for example flaps, on aircraft wings, since such transmissions can usually develop considerable torque, and the control surfaces and their actuators are mounted on structures which must be as light as possible, and may readily be damaged by application of excessive force.

UK Patent No. 1448101 discloses a device which acts to apply a brake when an output torque exceeds a predetermined level. However, a rotary transmission is commonly connected to an airflow control surface by link arms, and for a given torque the force applied to the control surface varies as the control surface moves. It is an object of the present invention to provide a device by means of which the force applied by a rotary transmission to a driven apparatus may be limited by a value which is substantially constant over the range of movement of the driven apparatus.

According to the invention there is provided a device for limiting the force which can be applied by a rotary transmission, said device including an input shaft, a pivotally movable output member, first and second elements drivingly connected to said input shaft and said output member respectively, means, responsive to the torque between said first and second elements and to an axial load therebetween, for causing said elements to rotate in unison, a brake responsive to relative rotation between said elements, for arresting rotation of at least said second element, and means responsive to the angular position of said output member for varying said axial load, whereby application of said brake is dependent on the angular position and torque of said output member.

Preferably said brake is operable to arrest rotation of both said first and said second element.

Figure 2:
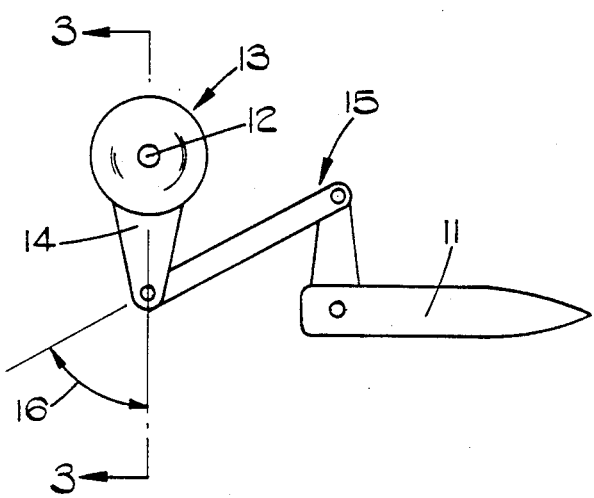
Figure 3:
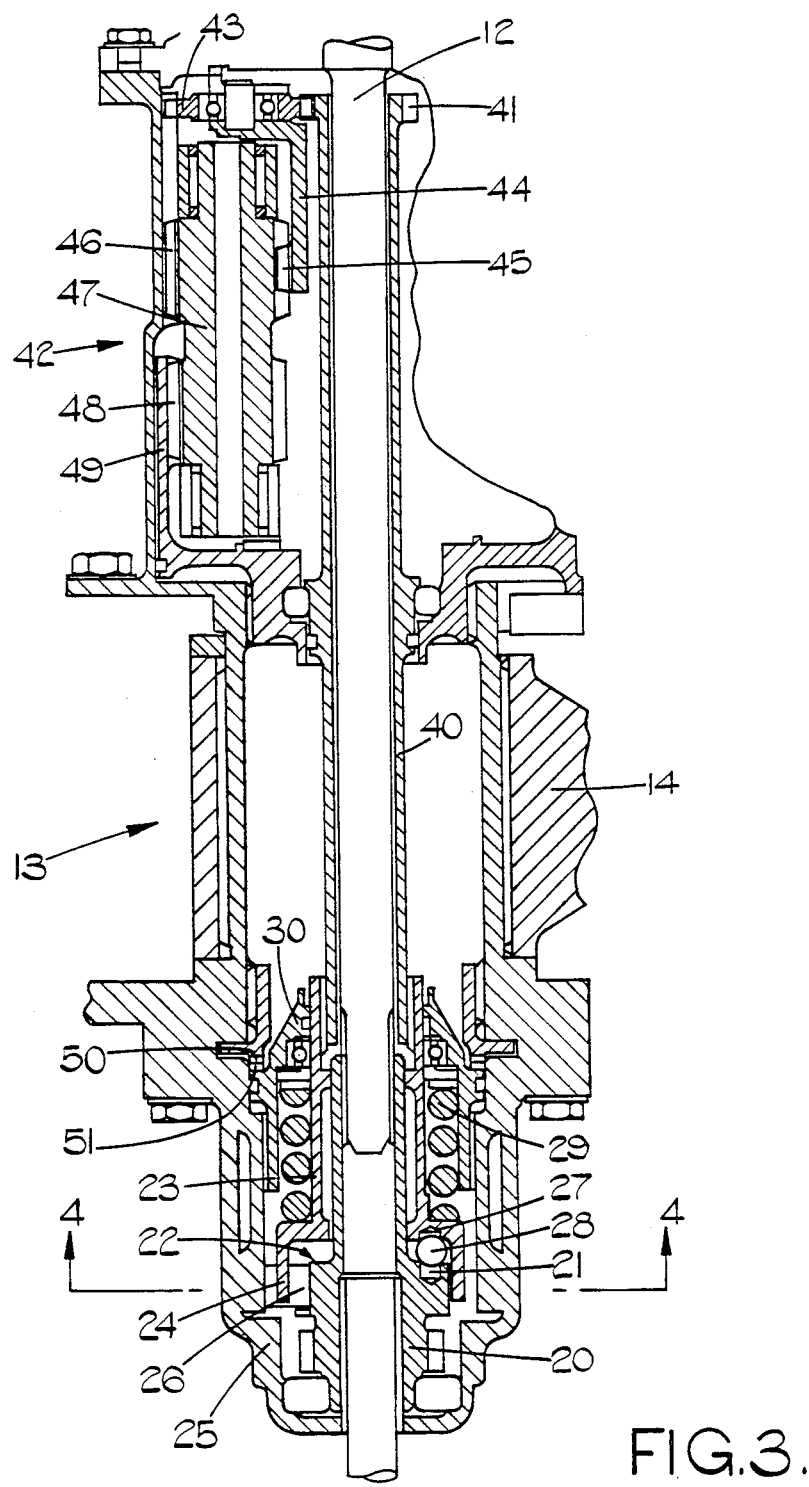
Figure 4:
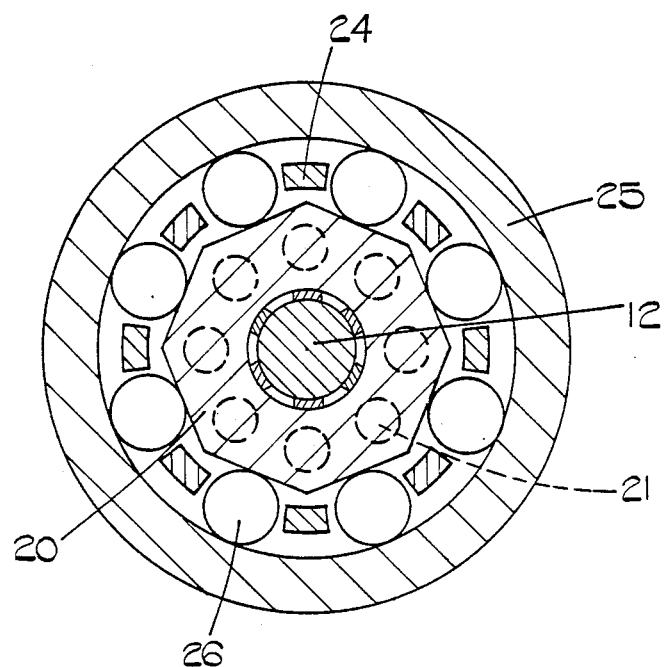

An embodiment of the invention will now be described by way of example only and with reference to the accompanying drawings in which:

FIG. 1 shows, diagrammatically, a part of an aircraft wing and airflow control surface together with a force limiting device according to the invention, FIG. 2 is a view, to an enlarged scale, on arrow 2 in FIG. 1, FIG. 3 is a section through a force limiting device, and FIG. 4 is a section on line 4—4 in FIG. 3.

Referring to FIG. 1, and aircraft wing 10 has mounted adjacent its trailing edge a plurality of flaps 11, only one of which is shown. The flaps 11 are movable between stowed and deployed positions as a result of rotation of a transmission shaft 12 which is driven by a motor (not shown) in the body of the aircraft. Each flap 11 is coupled to the shaft 12 through an associated speed reduction and force limiting device 13 which has an output arm 14 (FIG. 2) which is arranged to have only angular movement. The arm 14 is coupled to the flap 11 through a linkage 15. It will be apparent that the force transmitted from the arm 14 to the flap 11 is dependent, inter alia, on the angle 16 between the arm 14 and the line of action of an adjacent part of the linkage 15. The device 13 sets an upper limit to the torque available from the output arm 14, in dependence on the angular position of the arm 14, in such a way that the maximum force which can be applied to the flap 11 remains constant in all operating positions.

FIG. 3 is a detailed section of the device 13, taken generally on line 3—3 in FIG. 2. The shaft 12 is in splined engagement with a sleeve 20 which has an eight sided periphery and a plurality of indentations 21 on an axially-directed face 22. A further sleeve 23 is axially slidable outside the sleeve 20 and has eight axially extending fingers 24 which surround the flats on the sleeve 20. Located between the fingers 24, the flats on the sleeve. 20 and a relatively fixed part 25 of the device are eight rollers 26. The diameters of the rollers 26 are such that with the sleeve 20 and fingers 24 in the relative positions shown in FIG. 4, the rollers are free to rotate within the part 25 about the axis of the shaft 12.

The sleeve 23 has a face opposed to the face 22 of the sleeve 20, and this face of the sleeve 23 is provided with indentations 27 which are normally aligned with the indentations 21. Balls 28 are engaged between the indentations 21, 27 and the opposed faces of the sleeves 20, 23 are biassed towards one another by a spring 29 so that in normal operation the sleeve 23 is driven by the sleeve 20 in unison therewith. An abutment element 30 for the spring 29 is journalled on the sleeve 23 and is slidable within the part 25 to vary the force applied by the spring 29 to the sleeve 23.

An end of the sleeve 23 remote from the fingers 24 is in splined engagement with a further sleeve 40 which closely surrounds the shaft 12. An end of the sleeve 40 remote from the sleeve 23 carries a gear element 41 which provides a sun gear for a compound epicyclic gear train 42. The sun gear 41 meshes with a plurality of planet gears 43 supported on a carrier 44. Teeth on the carrier 44 provide a further sun gear 45 which meshes with one pinion 46 of a compound planetary element 47. Another pinion 48 of the element 47 meshes with a ring gear 49 which is drivingly connected to the output arm 14. Drivingly connected to the arm 14 for rotation therewith is a face cam 50 which engages cam follower portions 51 on the abutment element 30 for the spring 29.

If the torque load on the sleeve 23 exceeds a value determined by the force applied by the spring 29, the balls 28 will tend to ride out of their indentations 21, 27, permitting relative rotation between the sleeves 20, 23. If this happens the rollers 26 are jammed between the sleeve 20 and the stationary part 25 and rotation of the shaft and of the output arm 14 is arrested.

The cam 50 is in splined engagement with the output arm 14 so that the relative angular positions of these parts may be adjusted as required. The form of the cam 50 is such that the load applied by the spring 29 is modified in accordance with the angle 16 (FIG. 2) between the arm 14 and the link 15 so that the torque at which the sleeves 20, 23 are braked provides, for each angular position of the arm 14, a constant force on the flap 11.

We claim:

1. A device for limiting the force which can be applied by a rotary transmission, said device including an input shaft, a pivotally movable output member, first and second elements drivingly connected to said input shaft and said output member respectively, means, responsive to the torque between said first and second elements and to an axial load therebetween, for urging said elements to rotate in unison, a brake responsive to relative rotation between said elements, for arresting rotation of at least said second element, and means responsive to an operating position of said output member for varying said axial load, whereby application of said brake is dependent on said operating position and on the torque of said output member on said second element.

2. A device for limiting the force which can be applied by a rotary transmission, said device including an input shaft, a pivotally movable output member, first and second elements drivingly connected to said input shaft and said output member respectively, means, responsive to the torque between said first and second elements and to an axial load therebetween, for urging said elements to rotate in unison, a brake responsive to relative rotation between said elements, for arresting rotation of at least said second element, and means responsive to an operating position of said output member for varying said axial load, whereby application of said brake is dependent on said operation position and on the torque of said output member on said second element, said means for varying the axial load between said first and second elements comprising a spring biassing one of said elements towards the other element, a cam part coupled to said output member for movement therewith, and a cam follower part acting on an end of said spring.

3. A device as claimed in claim 1 or claim 2 in which said brake is operable to arrest movement of both of said elements.

4. A device as claimed in claim 1 or claim 2 in which the driving connection between said second element and said output member is by way of an epicyclic gear train.

5. A device as claimed in claim 1 or claim 2 in which said brake comprises a plurality of fingers on one of said elements, a plurality of faces on the other of said elements, a plurality of rolling members between said fingers, said rolling members being engageable with said faces, and a relatively fixed part against which said rolling members are urged by said faces as a result of relative rotation between said elements.

6. A device for limiting a force which can be applied by a rotary transmission, said device including an input shaft, a pivotally movable output member, first and second elements drivingly connected to said input shaft and said output member respectively, means, responsive to the torque between said first and second elements and to an axial load therebetween, for urging said elements to rotate in unison, means responsive to relative rotation between said elements, for arresting driving rotation of at least said second element, and means for continuous variation of said axial load in response to an operation position of said output member, whereby operation of said means responsive to relative rotation is dependent on said operation position and on the torque of said output member on said second element.

* * * * *